US007469940B2

(12) United States Patent
Sun et al.

(10) Patent No.: US 7,469,940 B2
(45) Date of Patent: Dec. 30, 2008

(54) DISCHARGE LAMP LIGHTING DEVICE, LIGHTING SYSTEM AND METHOD

(75) Inventors: Yiyoung Tony Sun, Beverly, MA (US); Takeshi Goriki, Kyoto (JP); Kenichi Fukuda, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 0 days.

(21) Appl. No.: 11/951,839

(22) Filed: Dec. 6, 2007

(65) Prior Publication Data

US 2008/0143270 A1 Jun. 19, 2008

Related U.S. Application Data

(62) Division of application No. 11/368,667, filed on Mar. 7, 2006, now Pat. No. 7,365,951.

(51) Int. Cl.
*G05F 1/00* (2006.01)
*H02H 3/00* (2006.01)

(52) U.S. Cl. ....................... 291/308; 291/291; 291/247; 291/224; 291/58; 361/72; 361/42; 361/65

(58) Field of Classification Search ................. 315/247, 315/246, 224, 225, 316, 292, 291, 307–311; 361/72, 42, 65, 30–36, 62–69, 38, 41–43, 361/55–60, 86–90
See application file for complete search history.

(56) References Cited

U.S. PATENT DOCUMENTS 6,657,400 B2 12/2003 Konopka et al.
2002/0118497 A1 * 8/2002 Petruska ...................... 361/23
2007/0188955 A1 8/2007 Elms

* cited by examiner

*Primary Examiner*—Tuyet Vo
(74) *Attorney, Agent, or Firm*—Greenblum & Bernstein, P.L.C.

(57) ABSTRACT

A method and apparatus for protecting a discharge lamp lighting device from damage due to mis-wiring of a source of electrical power to the discharge lamp lighting device. The protection apparatus includes a detector, a comparer and an inhibitor. The detector samples at least one monitor point associated with the discharge lamp lighting device to obtain at least one detection voltage. The comparer compares the at least one detection voltage with a reference voltage. The inhibitor inhibits an operation of the discharge lamp lighting device when the comparer determines that a mis-wiring of the source of electrical power to the discharge lamp lighting device exists.

6 Claims, 10 Drawing Sheets

DISCHARGE LAMP LIGHTING DEVICE, LIGHTING SYSTEM AND METHOD

This application is a divisional of U.S. patent application Ser. No. 11/368,667, filed Mar. 7, 2006, now U.S. Pat. No. 7,365,951 the disclosure of which is expressly incorporated herein by reference in its entirety.

FIELD OF THE INVENTION

The present invention relates to a discharge lamp lighting device for lighting a discharge lamp, and a lighting system that includes the discharge lamp lighting device.

BACKGROUND AND RELATED INFORMATION

In recent years, electronic ballasts employing inverter technology have become popular for use as a discharge lamp lighting device for lighting a discharge lamp. Conventionally, built-in type ballasts (also referred to as OEM type ballasts) have been the primary form of commercial discharge lamp lighting device that have been produced. OEM type ballasts are defined as a discharge lamp lighting device that is delivered to a lighting fixture factory that incorporates the discharge lamp lighting device (ballast) into a lighting fixture produced in the factory, which then ships the finished product for sale.

In recent years, the demand for so-called "indoor type ballasts" (also referred to as or retrofit type ballasts) has increased. A retrofit type ballast comprises a discharge lamp lighting device that is delivered to a job site for connection to at least one light fixture that has previously been installed on the job site. The retrofit type ballast is typically placed near the light fixture, or may be wired into the fixture itself.

Retrofit type ballasts generally include an input terminal unit and an output terminal unit. The input terminal unit comprises, for example, a terminal block to which electrical leads are connected, or just electrical wires, that connect the ballast to a commercial power source that supplies AC electrical power. The output terminal unit comprises, for example, a terminal block to which electrical wires are connected, or just electrical wires, that connect the ballast to a lighting fixture (i.e., discharge lamp).

It is more likely that a wiring error will occur with respect to the installation of a retrofit ballast by an electrician or do-it-yourself installer, as compared to the installation of an OEM ballast by a fixture manufacturer, especially when the ballast is to be installed in a place having poor visibility for the installer, such as, but not limited to, for example, on a ceiling. For example, the installer may mistake the output terminals for the input terminals, and connect the commercial power supply to the output terminal and thereafter, turn ON the commercial power supply (hereafter, this situation will be referred to as an input-output misconnection), damaging the ballast. The installer may also unintentionally connect one end (or both ends) of the output terminal to a fixture that is electrically grounded to earth, while the commercial power supply is connected to the input terminals and the high-pressure discharge lamp is connected to the output terminals (hereafter, this situation will be referred to as a ground misconnection), which again, may result in damage to the ballast when the commercial power supply is applied to the incorrectly wired ballast.

The operation of a discharge lamp lighting device when an input-output misconnection occurs with a ballast comprising a buck chopper and polarity reversing combination topology will be described with reference to FIG. 1B of the drawings, which illustrates a portion of a discharge lamp lighting device of the present invention. It is noted that while the following discussion is provided with respect to a discharge lamp lighting device that employs a buck chopper circuit, the analysis is very similar for a full bridge circuit that omits the buck chopper circuit.

When an installer mistakenly connects a commercial power supply 110 to an external output unit 112 and turns ON the external power supply, an AC power supply voltage is applied from the commercial power supply 110 through the external output unit 112 to connection point B associated with switching elements Q3 and Q4, and connection point C associated with switching elements Q5 and Q6. When this occurs, the AC power supply voltage is rectified by a diode bridge formed by diodes D3, D4, D5 and D6, which are parasitic diodes of the switching elements Q3, Q4, Q5 and Q6, respectively. The rectified voltage is applied to capacitor C1 in a DC power supply 102 via inductor L2 and diode D7 (which is a parasitic diode of switching element Q2) of a buck chopper circuit 104, which charges the capacitor C1.

When capacitor C1 is charged, the voltage on capacitor C1 (i.e., a voltage at point A in FIG. 1B) is supplied to control an auxiliary power supply unit 109, which provides electrical power to a DC power supply controller 107 and an inverter controller 108. Upon being supplied with the power supply voltage (electrical power) for operation, the inverter controller 108 starts a switching operation for lighting a high-pressure discharge lamp 113. In other words, the switching elements Q3, Q4, Q5 and Q6 are switched ON and/or OFF, as shown in FIG. 2-1, to alternate the DC voltage output from the buck chopper circuit 104 and to generate a high pulse voltage in conjunction with the igniter circuit in the polarity reversing circuit 105. The high pulse voltage is applied through the external output unit 112 to the high-pressure discharge lamp 113.

Since the AC power supply voltage from the commercial power supply 110 is being applied to the ballast through the external output unit 112 to connection point B of switching elements Q3 and Q4 and connection point C of switching elements Q5 and Q6, when switching element Q4 is switched ON by the inverter controller 108, a current path is formed from connection point C to connection point B through switching element Q4 and diode D6. A shunt current flows from connection point C to connection point B through the commercial power supply 110, which is connected to the external output unit 112. Thus, one or more of the switching element Q4, diode D4, and switching element Q6 (with its parasitic diode D6), may be damaged or destroyed.

Similarly, when switching element Q6 is switched ON by inverter controller 108, a current path is formed from connection point B to connection point C through switching element Q6 and diode D4. A shunt current flows between connection points B and C through the commercial power supply 110, which is connected to the external output unit 112. Thus, one or more of the switching element Q6, diode D6, and switching element Q4 with its parasitic diode D4, may be damaged or destroyed.

Thus, a problem arises. Specifically, when the installer mistakenly connects the commercial power supply 110 to the external output unit 112, the discharge lamp lighting device 101 may fail. It is noted that such a problem is not limited to the above described example. Whenever a power supply voltage is applied to the external output unit 112, the above-described problem may occur with respect to a discharge lamp lighting device having a configuration in which: (a) the auxiliary power supply unit 109 generates a power supply from the commercial power supply 110 for the operation of other circuit blocks; (b) the switching operation starts for an inverter unit 103 to supply an AC voltage to an external output unit 112 as soon as the inverter controller 108 is energized by the auxiliary power supply unit 109; and (c) the impedance looking into the output terminals of the external output unit becomes extremely small because of the switching action of the inverter unit.

The following explains the operation of a discharge lamp lighting device 101 when the ground misconnection occurs in a ballast having the buck chopper and polarity reversing combination topology in which the protector of the present invention (to be discussed below) is not included. It is noted that the following analysis would be similar for a full bridge topology that omits the buck chopper circuit.

When the installer mistakenly connects one end of the commercial power supply 110 to one end (or both ends) of the external output unit 112, directly or indirectly through earth ground, and switches ON the external power supply while the commercial power supply 110 is connected to the external voltage receiving unit 111, an AC power supply voltage is applied from the commercial power supply 110 to connection point B of switching elements Q3 and Q4 and/or to connection point C of switching elements Q5 and Q6. The AC power supply voltage is rectified by bridge DB1, and applied to capacitor C1 (via inductor L1 and diode D1) to charge capacitor C1 to a peak value of the commercial power supply voltage.

When capacitor C1 is charged, the voltage on capacitor C1 (e.g., the voltage at connection point A in FIG. 1B) energizes auxiliary power supply unit 109, which in turn supplies electrical power to the DC power supply controller 107 and the inverter controller 108 for the operation of the DC power supply circuit 102 and the inverter unit 103, respectively. Upon being supplied with electrical power, inverter controller 108 starts the switching operation to light the high-pressure discharge lamp 113, as was described above. In other words, the switching elements Q3, Q4, Q5 and Q6 are switched ON and/or OFF, as shown in FIG. 2-1, to alternate the DC voltage output from the buck chopper circuit and to generate a high pulse voltage in conjunction with the igniter circuit in the polarity reversing circuit 105. The high pulse voltage is applied through the external output unit 112 to the high-pressure discharge lamp 113.

Since one end of the commercial power supply 110 is connected to connection point B of switching elements Q3 and Q4 and/or connection point C of switching elements Q5 and Q6, when switching element Q4 is switched ON by the inverter controller 108, a current path is formed from connection point B to switching element Q4 to bridge DB1 to commercial power supply 110 and back to connection point B. As a result, a very low impedance path is formed, and a shunt current flows through switching element Q4. Thus, switching element Q4 may be damaged or destroyed.

Similarly, when switching element Q6 is switched ON by the inverter controller 108, a low impedance current path is formed from connection point C through switching element Q6. Shunt current flows from connection point C through commercial power supply 110 and back to connection point C, potentially damaging or destroying switching element Q6.

Therefore, when the installer mistakenly connects one end of the commercial power supply 110 to one or both ends of the external output unit 112 directly (or indirectly) through earth ground while the commercial power supply 110 is connected to the external voltage receiving unit 111, the discharge lamp lighting device 101 may be damaged.

It is noted that such a problem is not limited to the above described example. A similar problem may occur with respect to a discharge lamp lighting device 101 that has a configuration in which: (a) the auxiliary power supply unit 109 generates a power supply from a commercial power supply for the operation of other circuit blocks; (b) the switching operation starts for the inverter unit 103 to supply an AC voltage to an external output unit 112 as soon as the inverter controller 108 is energized by the auxiliary power supply 109; and (c) the impedance looking between one end of the input terminal and one or both ends of the output terminal 112 becomes extremely small because of the switching operation of the inverter unit 103.

The present invention addresses the above-described problems. According to a feature of the present invention, the occurrence of a failure due to an input-output misconnection and/or ground misconnection can be avoided or minimized. In the present invention, the auxiliary power supply unit 109 is deliberately energized at an initial start-up, so that the inverter controller 108 is energized. A protector is provided that functions to determine electrical connection characteristics of the discharge lamp lighting device and determine whether the polarity reversing circuit of the discharge lamp lighting device can be safely operated. If the protector determines that the electrical connection characteristics represent a mis-wiring situation, the protector inhibits the operation of the switching elements Q3 to Q6 of the discharge lamp lighting device.

In order to achieve the above-describe objective, a discharge lamp lighting device of the present invention includes an external voltage receiving unit, a DC power supply unit, an inverter unit, an external output unit, a controller and a auxiliary power supply unit. The external voltage receiving unit receives an input voltage from the external power supply. The DC power supply unit generates a regulated DC voltage from the power supply voltage received at the external voltage receiving unit. The inverter unit converts the DC voltage that is generated by the DC power supply unit to a periodic AC voltage to light a high-pressure discharge lamp. The external output unit supplies the AC voltage generated by the inverter unit to the external discharge lamp. The inverter controller controls the operation of the inverter unit. The auxiliary power supply unit that is connected to the output of the DC power supply unit generates the power supply voltage for the operation of the inverter controller.

According to this configuration, if the commercial power supply voltage is applied to the external output unit, the auxiliary power supply unit generates a power supply voltage for the operation of the inverter controller, while the protector functions to protect the discharge lamp lighting device from failure.

Even if one end of the commercial AC power supply is connected to one or both ends of the external output unit, directly or indirectly, through earth ground while the commercial AC power supply voltage is applied to the external voltage receiving unit, the protector will function to protect the discharge lamp lighting device from failure.

The protector comprises a detector, a comparer and an inhibitor. The comparer compares a voltage between at least one point of an internal circuit of the discharge lamp lighting device (or an equivalent value of the voltage), sampled by the detector, with a reference voltage (or an equivalent value of the reference voltage). The inhibitor restricts any switching operation of the polarity reversing circuit based upon the result of the comparison during a period from when the AC power supply voltage is applied to the discharge lamp lighting device (ballast) to when the switching operation starts for the inverter unit to output a voltage to the external output unit.

According to the above, a regulated DC voltage is generated by the DC power supply unit from the power supply voltage received from the external voltage receiving unit. The regulated DC power supply voltage is converted to a periodic AC voltage by the inverter unit. The AC voltage is supplied to the external output unit to energize the discharge lamp. If a power supply voltage is mistakenly applied to the external output unit, or one end of the AC power supply is mistakenly connected to one or both ends of the external output unit, directly or indirectly, through earth ground while it is still connected to the external voltage receiving unit, a voltage between two points of the internal circuit is detected and compared. In response to the comparison, the operation of the inverter unit is selectively prevented. As a result, the formation of a shunt current loop through the power supply and the internal switching elements is prevented, thereby preventing damage to the discharge lamp lighting device (ballast).

According to an object of the present invention, an apparatus is disclosed that protects a discharge lamp lighting device from damage resulting due to mis-wiring of a source of electrical power to the discharge lamp lighting device. The protector comprises a detector that samples at least one monitor point associated with the discharge lamp lighting device to obtain at least one detection voltage, a comparer that compares the at least one detection voltage with a reference voltage, and an inhibitor that inhibits an operation of the discharge lamp lighting device when a result of the comparison indicates that a mis-wiring of the power supply to the discharge lamp lighting device exists.

According to a feature of the invention, the at least one detection voltage is obtained by sampling a voltage at a junction of a switching element associated with a polarity reversing circuit of the discharge lamp lighting device. The inhibitor determines that the mis-wiring exists when the at least one detection voltage is greater than the reference voltage that is less than the square root of 2 (e.g., approximately 1.414) times a commercial power supply.

According to another feature of the invention, the at least one detection voltage is obtained by sampling an output voltage of a DC power supply of the discharge lamp lighting device, and the comparer determines that a mis-wiring of the power supply to the discharge lamp lighting device exists when the sampled output voltage does not exceed the reference voltage. Alternatively, the at least one detection voltage is obtained by sampling an output voltage of a buck chopper of the discharge lamp lighting device, and the comparer determines that a mis-wiring of the power supply to the discharge lamp lighting device exists when the sampled output voltage does not exceed the reference voltage. Still further, the at least one detection voltage may be obtained by sampling an output voltage of a rectifier of the discharge lamp lighting device, with the comparer determining that a mis-wiring of the power supply to the discharge lamp lighting device exists when the sampled output voltage does not exceed the reference voltage.

According to another object of the invention, a method is disclosed for protecting a discharge lamp lighting device from damage due to mis-wiring of a source of electrical power to the discharge lamp lighting device. At least one monitor point associated with the discharge lamp lighting device is detected to obtain at least one detection voltage that is compared with a reference voltage. The operation of the discharge lamp lighting device, such as a switching operation of a polarity reversing circuit, is inhibited when a result of the comparison of the at least one detection voltage with the reference voltage determines that a mis-wiring of the power supply to the discharge lamp lighting device exists.

According to a feature of the invention, an output voltage is detected at a junction of a pair of switching elements of the polarity reversing circuit of the discharge lamp lighting device, a switching operation of the pair of switching elements being inhibited when the comparing of the detected output voltage with the reference voltage indicates that the detected output voltage is greater than the reference voltage.

According to another feature of the invention, the switching operation of the polarity reversing circuit of the discharge lamp lighting device is inhibited when the comparison of the at least one detection voltage with the reference voltage indicates that the at least one detection voltage exceeds the reference voltage.

A still further feature of the invention is that the switching operation of the polarity reversing circuit of the discharge lamp lighting device is inhibited when the comparison of the at least one detection voltage with the reference voltage indicates that the reference voltage exceeds the at least one detection voltage.

According to another object of the invention, an apparatus is disclosed for lighting a discharge lamp. The apparatus includes a DC power supply that generates a predetermined DC voltage in response to an AC power source from an external voltage receiver, a DC power supply controller that controls an operation of a switching element of the DC power supply, an inverter having a plurality of switching elements that changes the predetermined DC voltage to an AC voltage sufficient to light a discharge lamp, an inverter controller that controls an operation of the plurality of switching elements of the inverter, an external outputter that supplies the AC voltage from the inverter to the discharge lamp, an auxiliary power supply that generates an operating voltage to power the DC power supply controller and the inverter controller based upon the power source from an external voltage receiver, the auxiliary power supply being configured to generate the operating voltage to power the inverter controller even if the AC power source is supplied to the external outputter, and a protector that operates to inhibit the operation of the plurality of switching elements of the inverter in response to a comparison of a monitor voltage obtained from the discharge lamp lighting apparatus with a reference voltage.

According to a feature of the invention, the monitor voltage represents a voltage at a junction of a pair of the plurality of switching elements of the inverter, and the protector inhibits the operation of the plurality of switching elements when the monitored voltage is determined to exceed the reference voltage, while enabling the operation of the plurality of switching elements when the monitored voltage is determined to be less than the reference voltage.

According to another feature of the invention, the monitor voltage represents the predetermined DC voltage of the DC power supply, and the protector inhibits the operation of the plurality of switching elements when the predetermined DC voltage is determined to be less than the reference voltage, while enabling the operation of the plurality of switching elements when the DC power supply is determined to be greater than the reference voltage.

According to a variation of the invention, the inverter includes a buck chopper, and the monitor voltage represents an output voltage of the buck chopper. The protector inhibits the operation of the plurality of switching elements when the output voltage of the buck chopper is determined to exceed the reference voltage, while enabling the operation of the plurality of switching elements when the output voltage of the buck chopper is determined to be less than the reference voltage. In this variation, the reference voltage is significantly less than a normal output voltage of the buck chopper.

According to another variation, the inverter includes a buck chopper, with the monitor voltage representing an output voltage of the buck chopper. The protector functions to inhibit the operation of the plurality of switching elements when the output voltage of the buck chopper is determined to be less than the reference voltage, and enables the operation of the plurality of switching elements when the output voltage of the buck chopper is determined to be greater than the reference voltage. In this variation, the reference voltage approximates a normal output voltage of the buck chopper.

In another variation, the DC power supply comprises a boost chopper, with the monitor voltage representing an output voltage of an AC-to-DC voltage converter. The protector inhibits the operation of the plurality of switching elements when the output voltage of the AC-to-DC voltage converter is determined to be less than the reference value, and enables the operation of the plurality of switching elements when the output voltage of the AC-to-DC voltage converter is determined to be greater than the reference value.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 1A-1 illustrates one possible configuration of a RLC networks useable with the circuit topology of FIGS. 1A and 1C;

FIG. 2-1 illustrates switching states of switching elements employed in the discharge lamp lighting devices of FIGS. 1A and 1B;

FIG. 2-2 illustrate waveforms at several sampling points of the discharge lamp lighting devices during a no-load period and a normal operation period;

DETAILED DESCRIPTION OF PREFERRED EMBODIMENTS

Figure 1A:
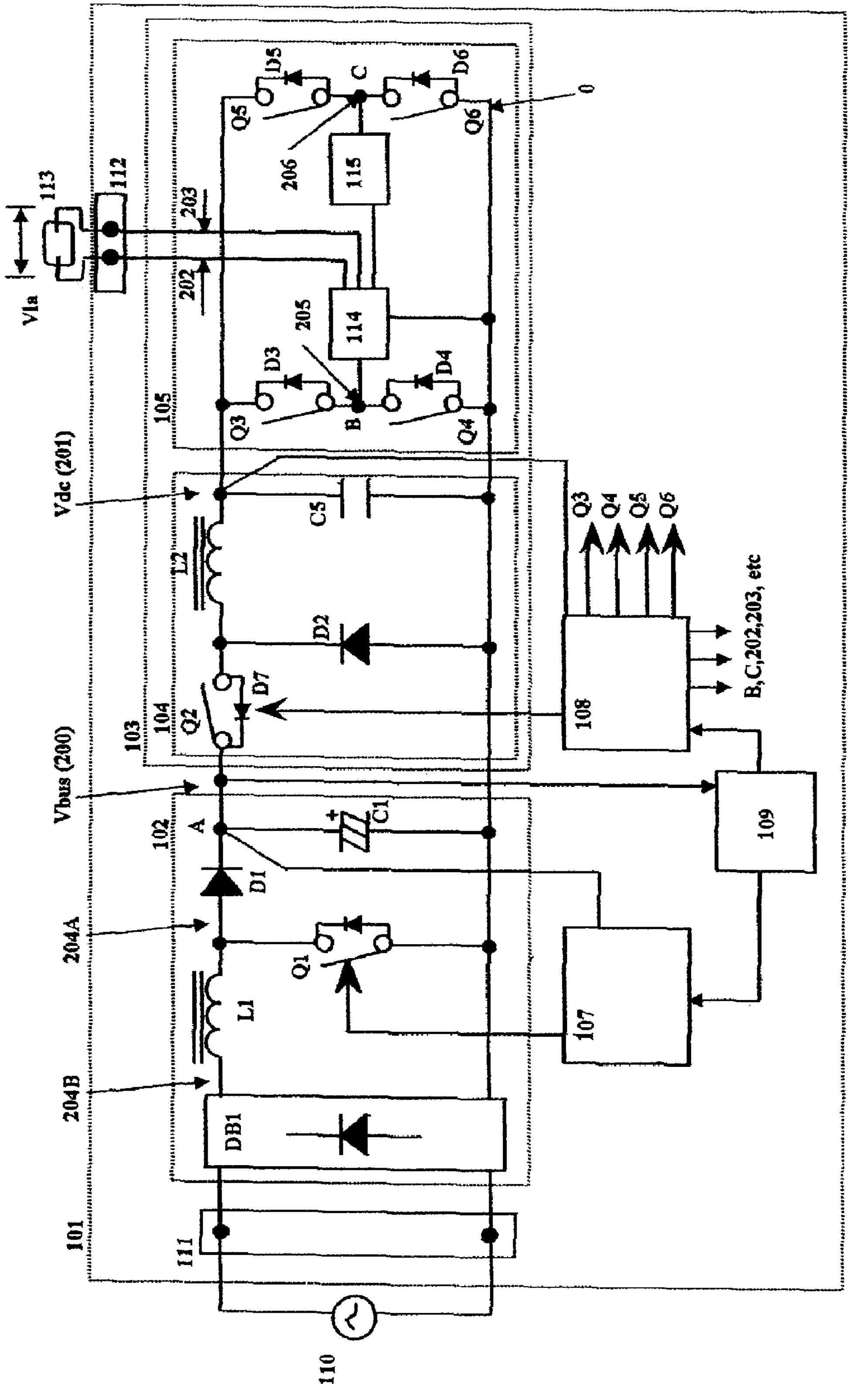
FIGS. 1A to 1C represent exemplary circuit topologies for discharge lamp lighting devices according to the present invention.
Figures 1, 1A:
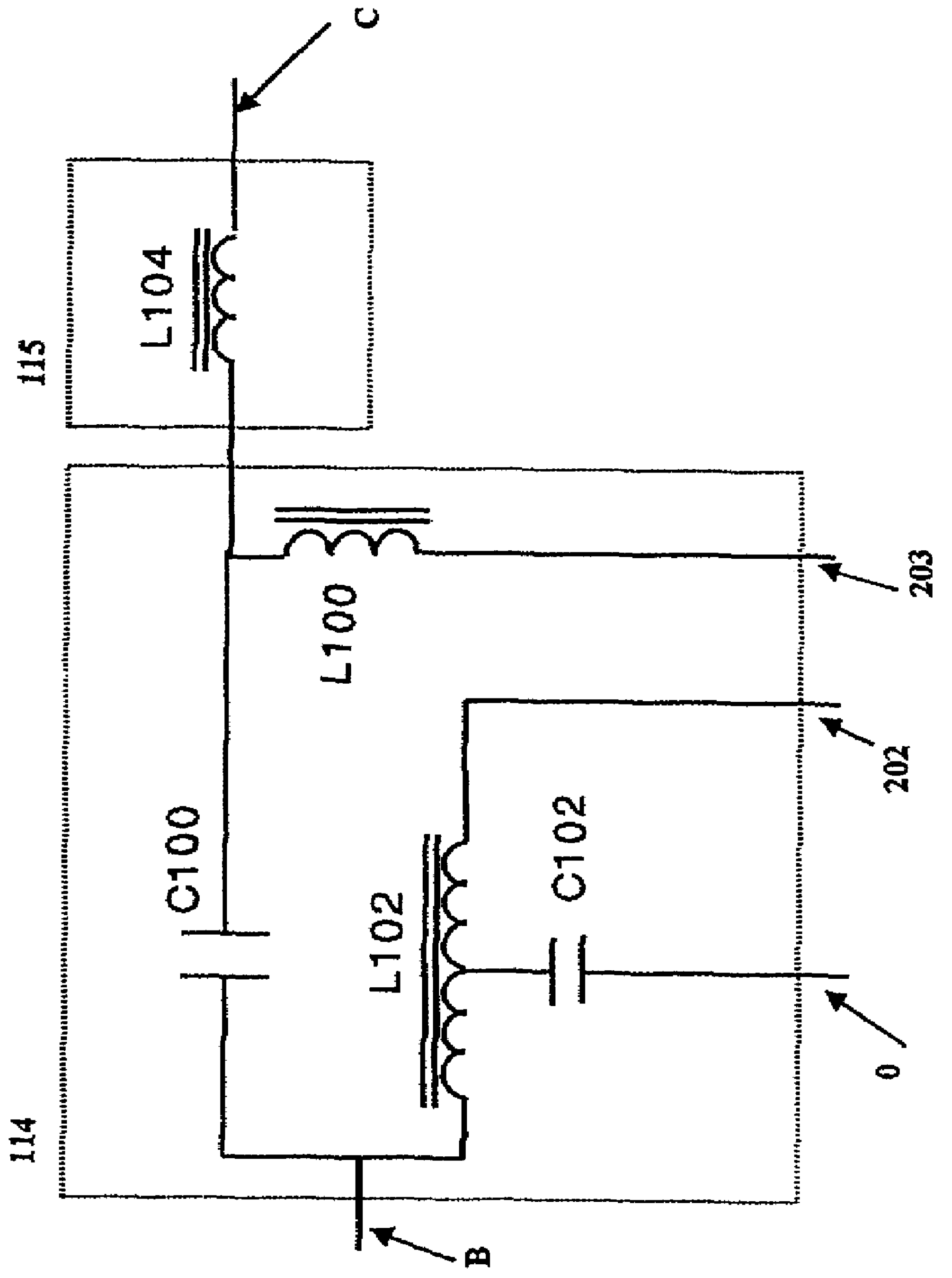
Figure 1B:
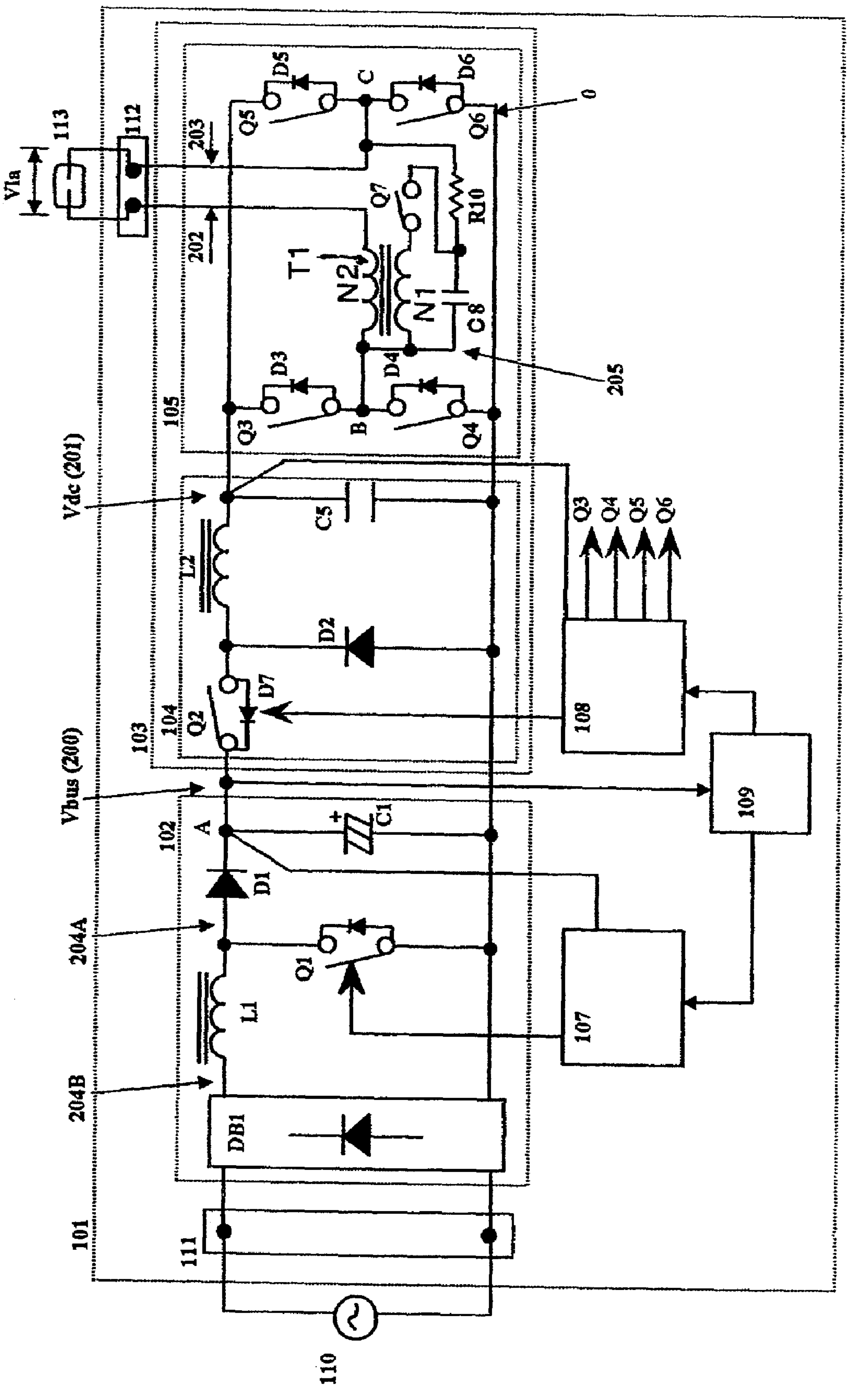
Figure 1C:
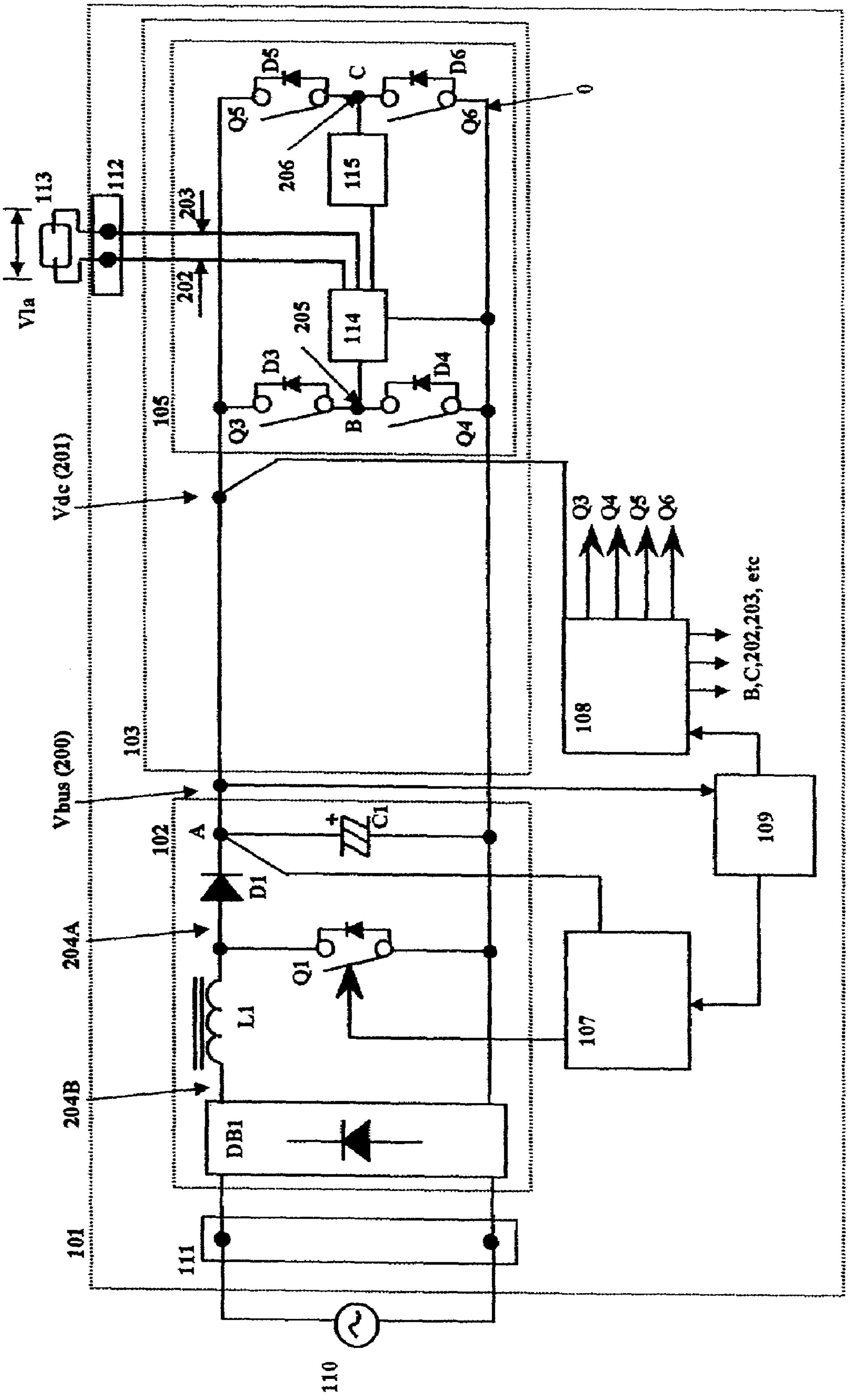

FIGS. 1A-1C illustrate various embodiments of a discharge lamp lighting device of the present invention that lights a high-pressure discharge lamp, such as, but not limited to, for example, a mercury or metal-halide lamp. Each discharge lamp lighting device (also referred to as an electronic ballast) 101 comprises a DC power supply 102, an inverter 103, a DC power supply controller 107, an inverter controller 108, an auxiliary power supply 109, and an external output 112.

The DC power supply 102 converts an AC power supply voltage, such as, for example, provided by a commercial power supply 110, to a regulated DC voltage. The AC power supply is supplied to the DC power supply 102 via an external voltage receiver 111, which comprises, for example, a terminal block or wires. The inverter 103 receives an output from the DC power supply 102 and produces a rectangular wave AC power output that is utilized to light a high-pressure discharge lamp 113. The DC power supply controller 107 controls the operation of the DC power supply 102, while the inverter controller 108 controls the operation of the inverter 103. Auxiliary power supply 109 generates a supply voltage for operating the DC power supply controller 107 and the inverter controller 108. External output 112, comprising, for example, a terminal block or wires, supplies the rectangular wave AC power output from the inverter 103 to the externally connected high-pressure discharge lamp 113. It is understood that reference to the high-pressure discharge lamp 113 includes a fixture and/or lamp fitting.

The DC power supply 102 comprises a so-called boost chopper circuit, which boosts the inputted AC power supply voltage and generates a regulated DC voltage. In the embodiments of FIGS. 1A to 1C, the DC power supply 102 comprises a diode bridge DB1 that converts an inputted AC voltage to a DC voltage, an inductor L1, a diode D1, a switching element Q1, and a capacitor C1. However, it is understood that variations in the configuration of the DC power supply 102 may be made without departing form the spirit and/or scope of the present invention.

In the embodiments illustrated in FIGS. 1A and 1B, the inverter 103 comprises a buck chopper circuit 104 and a polarity reversing circuit 105. The embodiment illustrated in FIG. 1C does not employ the buck chopper circuit 104. The buck chopper circuit 104 bucks down the DC voltage from the DC power supply 102 and adjusts the power supplied to the high-pressure discharge lamp 113 in accordance with a first control signal supplied by the inverter controller 108. In the disclosed embodiments, the buck chopper circuit 104 comprises a switching element Q2, a diode D2, an inductor L2, a capacitor C5, and a diode D7 that acts as a parasitic diode with respect to switching element Q2. It is understood that variations in the configuration of the buck chopper circuit 104 may be made without departing from the scope and/or spirit of the present invention.

The polarity reversing circuit 105 generates rectangular wave AC power by alternating the DC voltage (provided by the buck chopper circuit 104 in FIGS. 1A and 1B, or directly from the DC power supply 102 in FIG. 1C) according to a second control signal provided by the inverter controller 108. The polarity reversing circuit 105 comprises a full bridge circuit and an igniter circuit. The full bridge circuit is formed by switching elements Q3 and Q4 that are connected in series, and switching elements Q5 and Q6 that are connected in series. The igniter circuit, which generates a high voltage pulse of a few thousand volts to activate (ignite) the high-pressure discharge lamp 113, comprises a pulse transformer T1, a capacitor C8, a switching element Q7 (such as, but not limited to, for example, a voltage responsive element such as a SAIDAC), and a resistor R10. Again, it is understood that the disclosed construction of the polarity reversing circuit is presented merely for purposes of explaining the present invention, and thus, modifications and variations may be made thereto without departing from the scope and/or spirit of the invention.

Switching elements Q2 to Q6 comprise, for example, MOSFETs (Metal Oxide Semiconductor Field Effect Transistors). However, it is understood that other types of switching elements may be employed without departing from the spirit and/or scope of the present invention. Parasitic diodes D7 and D3 to D6 of respective switching elements Q2 to Q6 are connected in reverse directions. A voltage at connection (monitor) point A (corresponding to the voltage output from the DC power supply circuit 102) is supplied to the auxiliary power supply 109. As noted above, the auxiliary power supply 109 generates and supplies a supply voltage to the DC power supply controller 107 and the inverter controller 108.

Connection (monitor) point B of switching elements Q3 and Q4, and connection (monitor) point C of switching elements Q5 and Q6 are connected to the external high-pressure discharge lamp 113 through the pulse transformer T1 and the external output unit 112 (see FIG. 1B).

The above discussion has been presented with respect to a discharge lamp lighting device having a buck chopper circuit 104 and a polarity reversing circuit 105 with a pulse ignition, as depicted, for example, in FIG. 1B. Other topologies are also possible, such as, but not limited to, for example, a discharge lamp lighting device in which the buck chopper circuit is eliminated, leaving only the polarity reversing circuit. The topology of a polarity reversing circuit may include, for example, a full bridge circuit and an igniter circuit. FIG. 1C depicts an example of a discharge lamp lighting device that comprises a full bridge configuration without the buck chopper circuit. In the embodiment of FIG. 1C, switching elements Q3 to Q6 function as both the buck chopper circuit and the polarity reversing circuit.

In the present discussion, the igniter circuit is generally referred to as pulse ignition. Another type of ignition, referred to as resonant ignition, is possible when the pulse transformer T1, along with any other component(s) related to the pulse ignition, are replaced by two interconnected RLC/Semi networks 114 and 115. Networks 114 and 115 form a generic circuit topology for either pulse ignition or resonant ignition. FIG. 1A-1 shows one possible configuration of networks 114 and 115. The specific configuration of the pulse ignition or resonant ignition is not critical to the operation of the present invention, the disclosed configurations being non-limiting examples presented to assist in the understanding of the present invention.

FIG. 1A-1 illustrates an example of the networks 114 and 115 useable with the present invention. In the illustrated example, network 114 comprises capacitive elements C100 and C102, an inductive element L100 and a multi-tap inductive element L102, while network 115 comprises an inductive element L104.

A first end of capacitive element C100 is electrically connected to terminal point B, shown in FIGS. 1A and 1C, and a first end of the multi-tap inductive element L102. A second end of the capacitive element C100 is electrically connected to a first end of the inductive element L100 and a first end of inductive element L104 of network 115. A second end of the inductive element L100 is electrically connected to terminal point 203, shown in FIGS. 1A and 1C. A second end of the multi-tap inductive element L104 is electrically connected to terminal point 202, shown in FIGS. 1A and 1C, while the tap is electrically connected to a first end of capacitive element C102. A second end of the capacitive element C102 is electrically connected to terminal point O, shown in FIGS. 1A and 1C. A second end of inductive element L104 is electrically connected to terminal point C, shown in FIGS. 1A and 1C. It is understood that alternative networks may be used without departing from the scope and/or spirit of the invention.

The following discussion describes an operation sequence of the discharge lamp lighting device 101, with respect to a circuit topology having the buck chopper circuit 104 and the polarity reversing circuit 105, as shown in FIGS. 1A and 1B. An AC power supply voltage from a commercial power supply 110 connected to an external voltage receiving unit 111, which is generally supplied by turning ON an external power supply switch (not shown), is converted to a DC voltage via a DC power supply circuit 102. In the disclosed embodiment, the DC power supply circuit 102 comprises a diode bridge DB1, an inductor L1, a diode D1 and a capacitor C1. The DC voltage charged to capacitor C1 is supplied to an auxiliary power supply unit 109, which supplies a predetermined voltage (or voltages) to a DC power supply controller 107 and an inverter controller 108.

In the disclosed embodiment, the auxiliary power supply unit 109 comprises a DC-DC converter circuit that outputs a constant DC voltage, or voltages, from, but not limited to, for example, approximately several tens to several hundreds of volts. The construction of DC-DC converters are known to those skilled in the art, and thus, a detailed description thereof is omitted herein.

The DC power supply controller 107 and the inverter controller 108, which are energized with the supply voltage from the auxiliary power supply unit 109, generate control signals that are supplied to the DC power supply circuit 102 and the inverter unit 103. The inverter unit 103 begins the switching operation for lighting the high-pressure discharge lamp 113. Specifically, when the high-pressure discharge lamp 113 is not lit, buck chopper circuit 104, which receives the DC voltage generated by the DC power supply circuit 102, receives a signal from the inverter controller 108 to output a maximum voltage that is allowed by an application. Polarity reversing circuit 105, which receives the DC voltage output from the buck chopper circuit 104, alternates the input DC voltage and begins the operation of the igniter circuit to activate (illuminate) the external high-pressure discharge lamp 113.

Figures 1, 2:
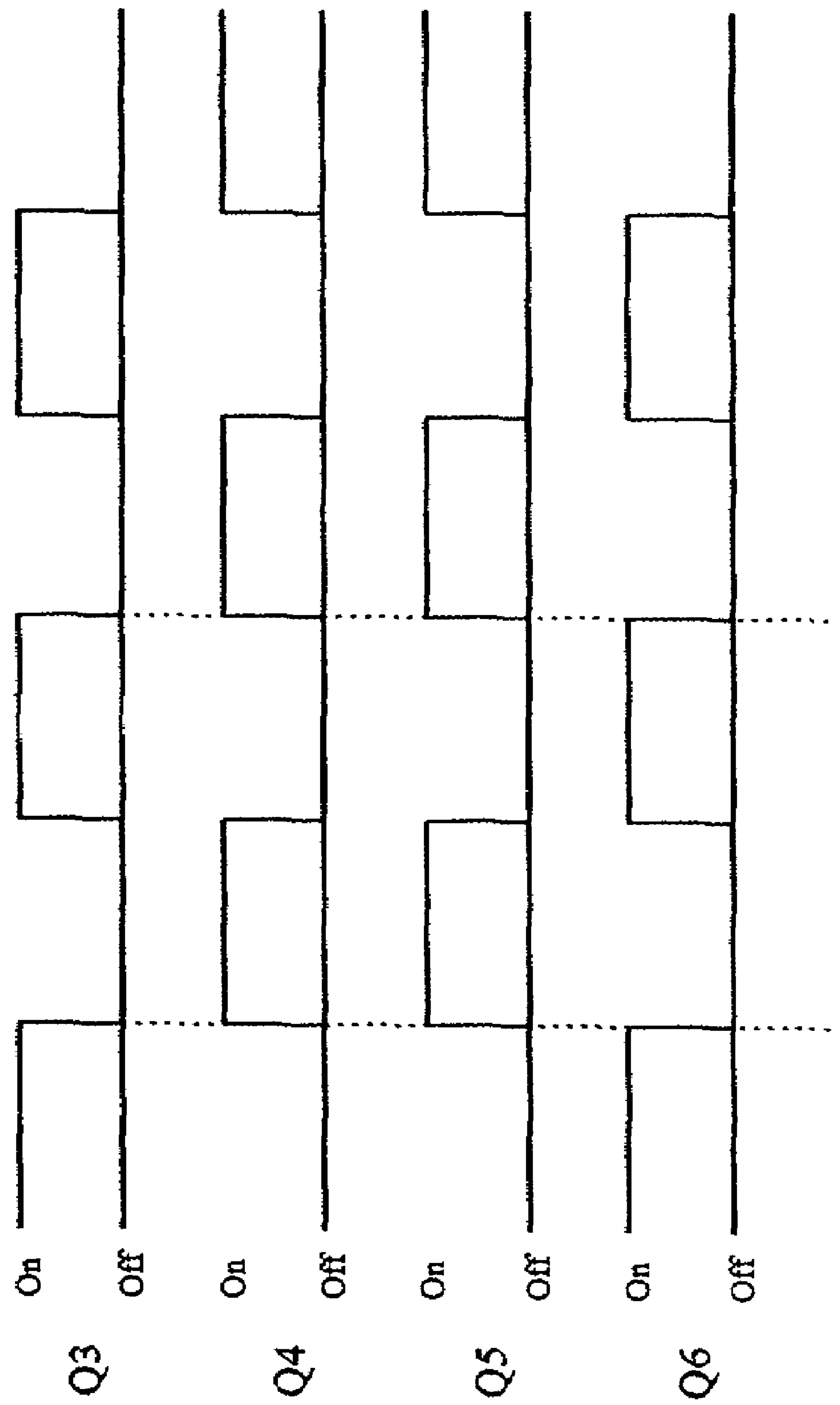
Figure 2:
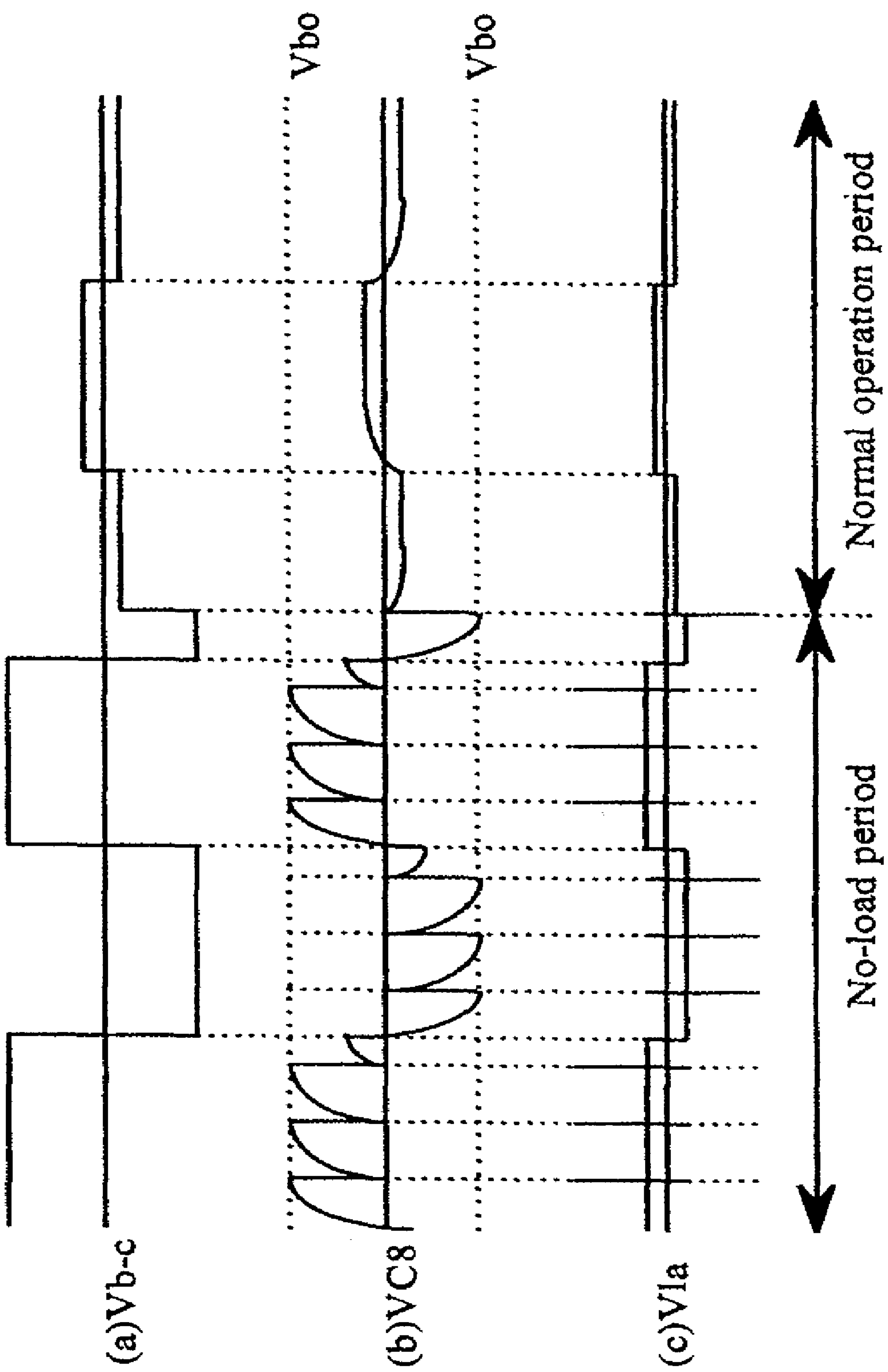

FIG. 2-1 illustrates the switching operation of the polarity reversing circuit 105. By having switching elements Q4 and Q5 OFF when switching elements Q3 and Q6 are ON and vice versa, the voltage between connection point B and connection point C of the polarity reversing circuit 105 (see, for example, FIG. 1B) becomes a rectangular wave voltage Vb-c (see FIG. 2-2(*a*)). Voltage Vb-c is formed because of alternating the DC voltage output from the buck chopper circuit 104. Upon receiving the rectangular wave voltage Vb-c, which depends on a time constant formed by resistor R10 and capacitor C8, capacitor C8 is gradually charged to a voltage VC8, as shown in FIG. 2-2(*b*).

Switching element Q7 is turned ON when the voltage on capacitor C8 reaches a break-over voltage Vbo of the switching element Q7. Generally, the break-over voltage Vbo of the switching element Q7 is designed to be less than a maximum output voltage of the buck chopper circuit 104 when the discharge lamp 113 is not lit, and larger than the output voltage when the high-pressure discharge lamp 113 is lit. When switching element Q7 is turned ON, the electrical charge accumulated in capacitor C8 is discharged via capacitor C8, switching element Q7, and a primary winding N1 of pulse transformer T1. The pulse voltage generated in the pulse transformer T1 is boosted up (increased), and a high pulse voltage (equal to, for example, several thousand volts) is generated in secondary winding N2 of the pulse transformer T1. The high pulse voltage is superimposed on the rectangular wave voltage Vb-c to generate voltage VIa (see FIG. 2-2(*c*)) between the two ends of the high-pressure discharge lamp 113.

By applying the high pulse voltage between the two ends of the high-pressure discharge lamp 113, the high-pressure discharge lamp 113 is ignited (activated). The impedance of the high-pressure discharge lamp 113, after dropping rapidly, increases gradually as it approaches a steady state. The inverter controller 108 determines the switching frequency and the duty cycle of the buck chopper circuit 104, and generates a necessary control signal to operate switching element Q2, based on the impedance of the high-pressure discharge lamp 113. The DC voltage output from the buck chopper circuit 104 becomes nearly the same value as an absolute value of the voltage Via between the two ends of the high-pressure discharge lamp 113. Polarity reversing circuit 105 continues the switching operation shown in FIG. 2-1 even after the high-pressure discharge lamp 113 has been activated.

It is noted that the operating principle for a full bridge discharge lamp lighting circuit that omits the buck chopper circuit and employs a resonant ignition or a pulse ignition is similar.

The following description is provided with respect to several embodiments of the present invention with reference to the drawings. Similar elements are assigned the same numerical characters throughout the various embodiments, and thus repetitive descriptions will be omitted. The embodiments presented herein are non-limiting, the embodiments being presented for the purpose of explaining the present invention. Thus, the invention is not to be limited to that shown herein. Variations and modifications to that disclosed herein are expressly envisioned without departing from the spirit and/or scope of the invention.

A first embodiment of a protector employed with a discharge lamp lighting device of the present invention is illustrated with reference to FIGS. 1A to 1C and 3.

Figure 3:
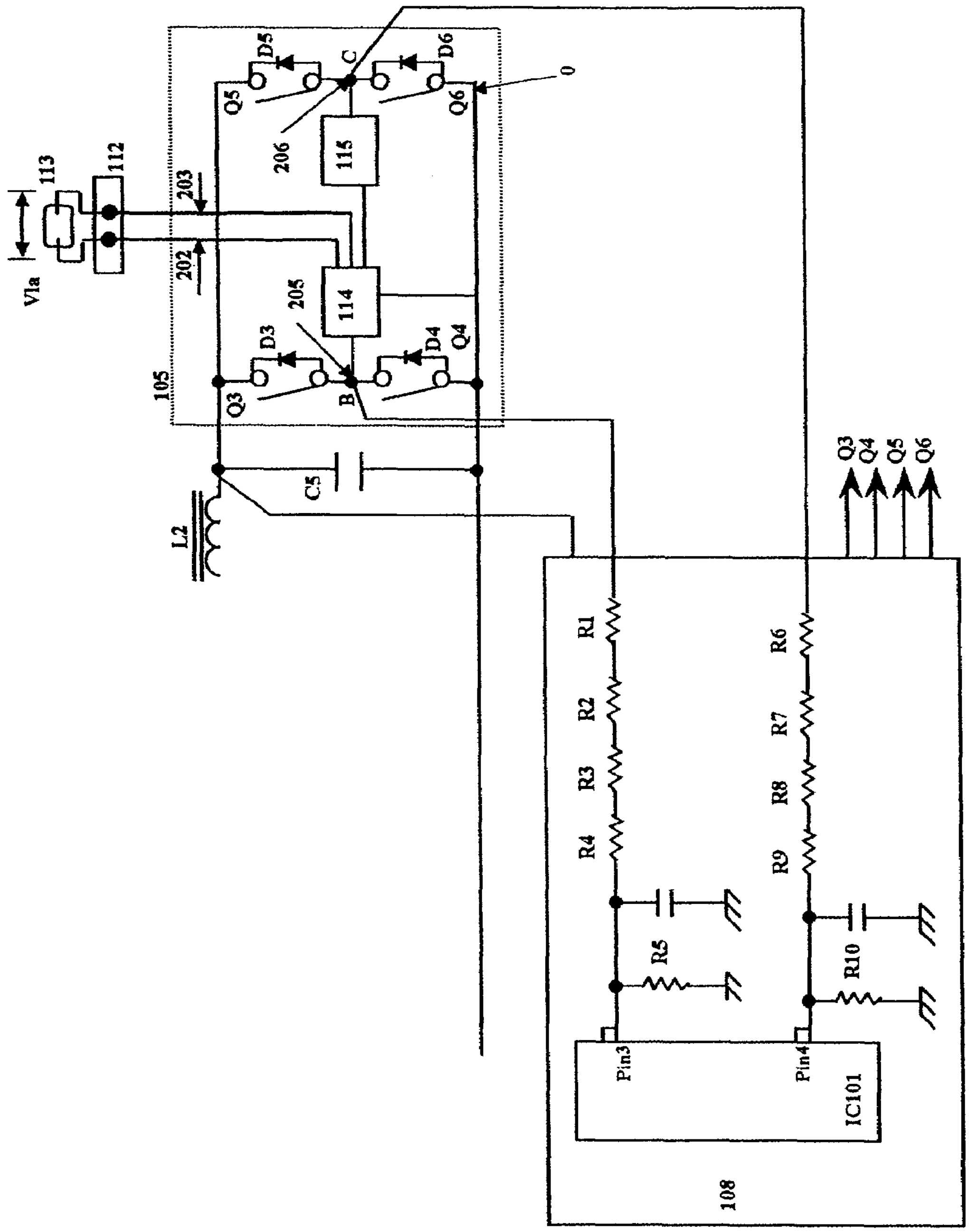
FIG. 3 illustrates an example of a comparer of the present invention utilized with the present invention that operates to prevent damage to the circuitry of the discharge lamp lighting device during a mis-wiring situation.

Discharge lamp lighting device 101 includes a voltage detector, such as, but not limited to, for example, a processor IC101 that detects a voltage VB at connection point B and a voltage VC at connection point C (see FIG. 3). In the disclosed embodiment, scaling resistors R1 to R5 are used to linearly scale down the voltage VB at connection point B to be equal to a conversion value Vb. Similarly, scaling resistors R6 to R10 are used to linearly scale down the voltage VC at connection point C to a conversion value Vc. The scaled voltages Vb and Vc are applied to A/D converter input terminals 3 and 4, respectively, of the processor IC101. As shown in FIG. 3, a first optional smoothing capacitor (not labeled) may be provided between the junction of scaling resistors R4 and R5 to smooth voltage Vb. Similarly, a second optional smoothing capacitor (not labeled) may be provided at the junction of scaling resistors R9 and R10 to smooth voltage Vc. However, it is noted that such smoothing capacitors are generally not required with today's processors and thus, they may be omitted.

The voltage at connection point B, or the voltage at connection point C will be equal to, in the disclosed embodiment, approximately, 465V, which is approximately the same voltage as the output voltage of the DC power supply circuit 102. A voltage division ratio of the scaling resistors R1 to R5 and scaling resistors R6 to R10 are set so that the conversion value Vb or Vc to be applied to A/D converter terminals 3 and 4 of the processor IC101 is less than a maximum value allowed for the processor, which is typically 5V in most applications. The conversion value Vb and/or conversion Vc is read by the processor IC101 as 10-bit data. When the output voltage at connection point B or C is at approximately 465V, that is, when the conversion value Vb or Vc is approximately 5V, a maximum data value of D1024 is read by the processor IC101. Considering tolerances and for ease of calculation, the conversion value of Vb or Vc is selected to be substantially equal to 5V when the output voltage at connection points B and C, respectively, are each substantially equal to 500V.

In the disclosed embodiment, a reference voltage VREF1 is set to be substantially equal to 50 volts. This voltage is set at a level lower than the peak voltage of approximately 108 volts AC, which reflects an estimated 10 percent deviation from a nominal 120 volts AC voltage provided from the commercial power supply 110. In the disclosed embodiment, conversion value $V_{REF1}$ of reference voltage VREF1 is stored in the processor IC101 as 10-bit data. The conversion value $V_{REF1}$ is set at D102, which is calculated based on a ratio of VREF1 (approximately equal to 50 volts) to a maximum output voltage VB or VC (approximately equal to 500 volts), when the maximum output voltage VB or VC at connection point B or point C, respectively, is set at D1024.

When the commercial power supply voltage 110 is initially applied to the discharge lamp lighting device 101 having the above-described configuration, a voltage equal to approximately 1.414 times the input voltage is smoothed and applied to capacitor C1 of the DC power supply circuit 102. The voltage at capacitor C1 (connection A) is additionally supplied to the auxiliary power supply unit 109 to activate the processor IC101.

As a condition for outputting driving control signals for controlling the switching of switching elements Q3 to Q6 of the polarity reversing circuit 105, the inverter controller 108 is configured to compare the conversion value Vb (and/or Vc) with the conversion value $V_{REF1}$, based on a program executing in the processor IC101, so as to satisfy both of the following:

$$Vb<V_{REF1}, \text{ and}$$

$$Vc<V_{REF1}.$$

When the AC power supply voltage is supplied to the external voltage receiving unit 111 of the discharge lamp lighting device 101, and the polarity reversing circuit 105 is not switching, the output voltage VB at connection point B (or the output voltage VC at connection point C) becomes equal to approximately 0V. Thus, a normal switching operation may be performed so as to satisfy $Vb<V_{REF1}$ and $Vc<V_{REF1}$ at all time within a full line frequency cycle.

On the other hand, if the power supply voltage 110 is inadvertently connected to the external output unit 112 of the discharge lamp lighting device 101, a half wave rectified voltage with a peak value of approximately 1.414 times the AC power supply voltage appears at connection point B and/or at connection point C of the polarity reversing circuit 105. Because the conversion value Vb will be greater than the conversion value $V_{REF1}$ and/or Vc will be greater than $V_{REF1}$ at some point within a full line frequency cycle, processor IC101 maintains the polarity reversing circuit 105 in a standby state. Therefore, the switching operation of the polarity reversing circuit 105 does not start, which prevents damage to the switching elements Q3 to Q6 of the polarity reversing circuit 105.

If the commercial power supply 110 is connected to the external voltage receiving unit 111 of the discharge lamp lighting device 101 and at least one end of the external output unit 112 is connected (directly or indirectly) to earth ground while the polarity reversing circuit 105 is not switching, the output voltage VB at connection point B and/or the output voltage C at connect point C is a half wave rectified voltage with a peak value of approximately 1.1414 times the power supply voltage. In other words, Vb will be greater than $V_{REF1}$ and/or Vc will be greater than $V_{REF1}$ at some point within a full line frequency cycle, resulting in the processor IC101 maintaining the polarity reversing circuit 105 in a standby state. Therefore, the switching operation of the polarity reversing circuit 105 does not start, which prevents damage to the switching elements Q3 to Q6 of the polarity reversing circuit 105.

It is noted that the above analysis is equally applicable to an inverter unit 103 that does not include the buck chopper circuit 104, but only includes the full bridge only topology.

A second embodiment of the present invention will now be described. The discharge lamp lighting device 101 of the second embodiment of the present invention is discussed with reference to FIGS. 1A-1C and 4.

Figure 4:
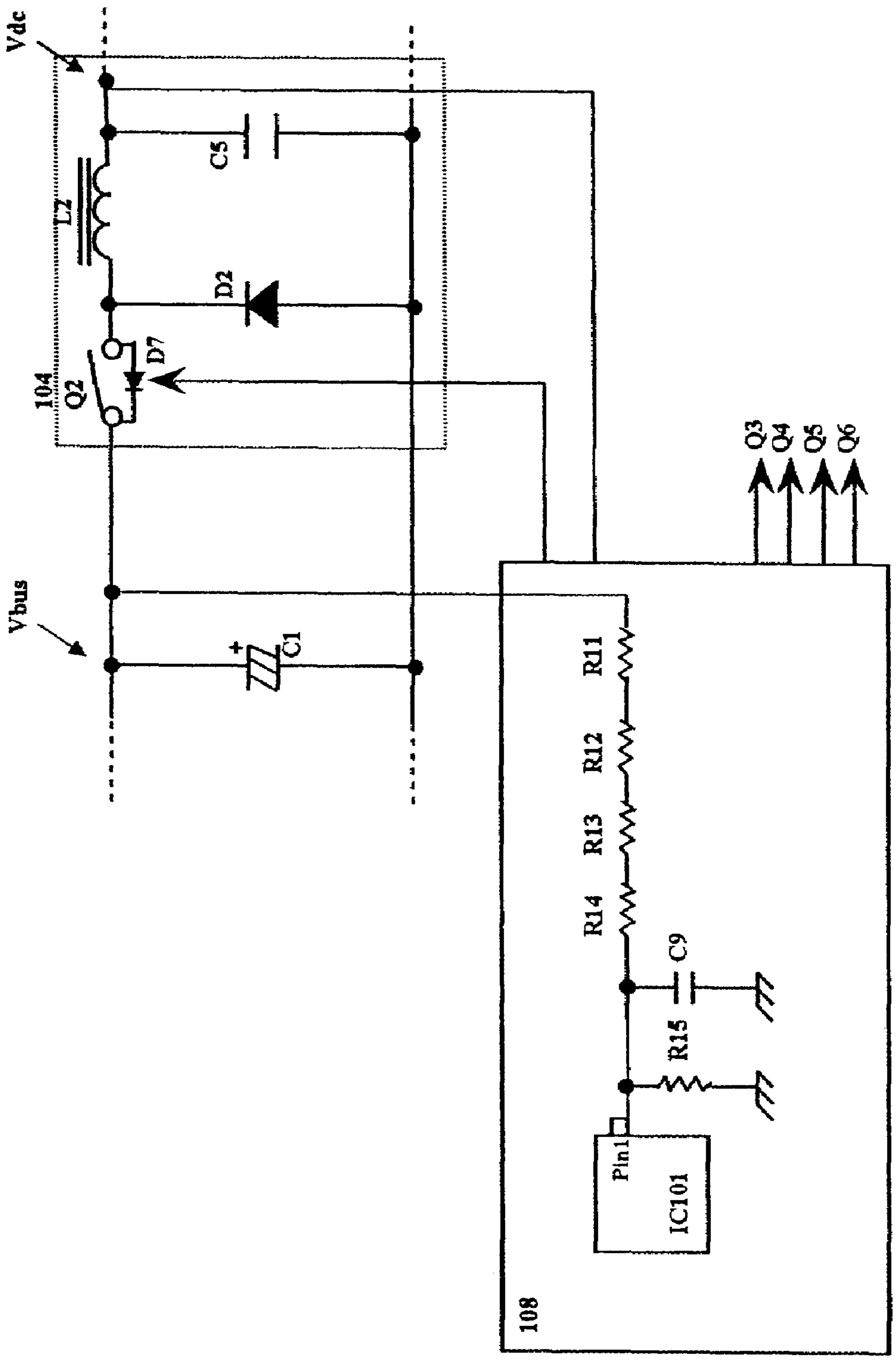
FIG. 4 illustrates another example of the comparer according to the present invention.

Discharge lamp lighting device 101 includes a boost chopper circuit that provides a regulated voltage of approximately 465 volts as an output voltage VC1 for a commercial power supply voltage input of approximately 120 volts to 277 volts. A conversion method for the output voltage VC1 is configured as shown in FIG. 4. Specifically, scaling resistors R11 to R15 are used to linearly scale down the output voltage VC1 to a conversion value $V_{C1}$, which is smoothed by the inclusion of a smoothing capacitor C9 connected between electrical ground and the junction of scaling resistors R14 and R15. The smoothed conversion value $V_{C1}$ is applied to A/D converter input terminal 1 of processor IC101, which includes an A/D conversion function. It is noted that since modern processors are sufficiently fast, the smoothing capacitor C9 is not necessary for most applications, and may be omitted without adversely affecting the operation of the present invention.

In the second embodiment, when the output voltage VC1 of the DC power supply circuit is substantially equal to 465 volts, the voltage division ratio is set so that conversion value $V_{C1}$ to be applied to the processor IC101 is less than the maximum value allowed for the microprocessor, which is typically 5 volts in most applications. The conversion value $V_{C1}$ is read by the processor IC101 as 10-bit data. When the output voltage VC1 is substantially equal to 465 volts, that is, when the conversion value $V_{C1}$ is substantially equal to 5 volts, the maximum value of D1024 is read by the processor IC101. Considering tolerances and for ease of calculation, the conversion value $V_{C1}$ is selected to be substantially equal to 5 volts when the output voltage VC1 is substantially equal to 500 volts.

A reference voltage VREF4, which represents a nominal output voltage VC1 (equal to approximately 465 volts) at the output of the DC power supply circuit 102, is set to approximately 440 volts. This voltage is set at a level that is lower than a 2 to 3 percent deviation of the output voltage VC1 (465*0.97=451 volts) but higher than a peak value of a maximum voltage of 305 volts for a commercial power supply (305*1.414=431). Conversion value $V_{REF4}$ of the reference voltage VREF4 is stored in the processor IC101 as 10-bit data. The digital form of conversion value $V_{REF4}$ is set at D900, which is calculated based on the ratio of VREF4 (equal to approximately 440 volts) to a maximum output voltage VC1 (equal to approximately 500 volts).

In the disclosed embodiments, processor IC101 comprises a part of the inverter controller 108. However, the processor IC101 and the scaling resistors that comprise the protector may be separate from the inverter controller 108 (that is, not incorporated into the inverter controller 108) without departing from the spirit and/or scope of the invention. Inverter controller 108 outputs signals for operating the switching element Q2 of the buck chopper circuit 104 and the switching elements Q3 to Q6 of the polarity reversing circuit 105 in a buck chopper and polarity reversing combination topology. In a polarity reversing circuit with a full bridge topology that does not include the buck chopper circuit (such as shown in FIG. 1C), the inverter controller 108 outputs signals for the switching operation of the full bridge circuit only.

When the commercial power supply voltage is initially applied to the discharge lamp lighting device 101 having the above-described configuration, a voltage that is approximately equal to 1.414 times the input voltage is smoothed and applied to capacitor C1 of the DC power supply circuit 102. Auxiliary power supply unit 109 outputs a power supply voltage to activate the processor IC101, based on the voltage across capacitor C1.

Driving control signals for the buck chopper circuit 104 and the polarity reversing circuit 105 are selectively output by the inverter controller 108 in accordance with instructions executed by the processor IC101 as a result of the comparison of conversion value $V_{C1}$ and conversion value $V_{REF4}$, and a determination that the conversion value $V_{C1}$ is greater than the conversion value $V_{REF4}$. When this condition is satisfied, it means the power supply voltage is supplied to the external voltage receiving unit 111 of the discharge lamp lighting device 101, the DC power supply controller 107 is activated after receiving the power supply voltage for the control operation, which is output from the auxiliary power supply unit 109, and the DC power supply circuit 102 executes a boost chopper circuit operation by which capacitor C1 at the output of the DC power supply unit is charged to approximately 465 volts. In other words, because the conversion value $V_{C1}$ is greater than the conversion value $V_{REF4}$, a normal switching operation occurs.

On the other hand, if the power supply voltage is inadvertently supplied to the external output unit 112 of the discharge lamp lighting device 101, the DC power supply circuit 102 receives no voltage at its input terminals. As a result, capacitor C1 of the DC power supply unit is charged to approximately 1.414 times the power supply voltage through the polarity reversing circuit 105 and the buck chopper circuit. In other words, $V_{C1}$ will be less than $V_{REF4}$, so the processor IC101 maintains the discharge lamp driving device in a standby state. Therefore, the switching operation for the buck chopper circuit 104 and the polarity reversing circuit 105 does not start, preventing damage to the switching elements of the polarity reversing circuit 105.

A third embodiment of the present invention will now be discussed with reference to FIGS. 1A, 1B, and 5.

Figure 5:
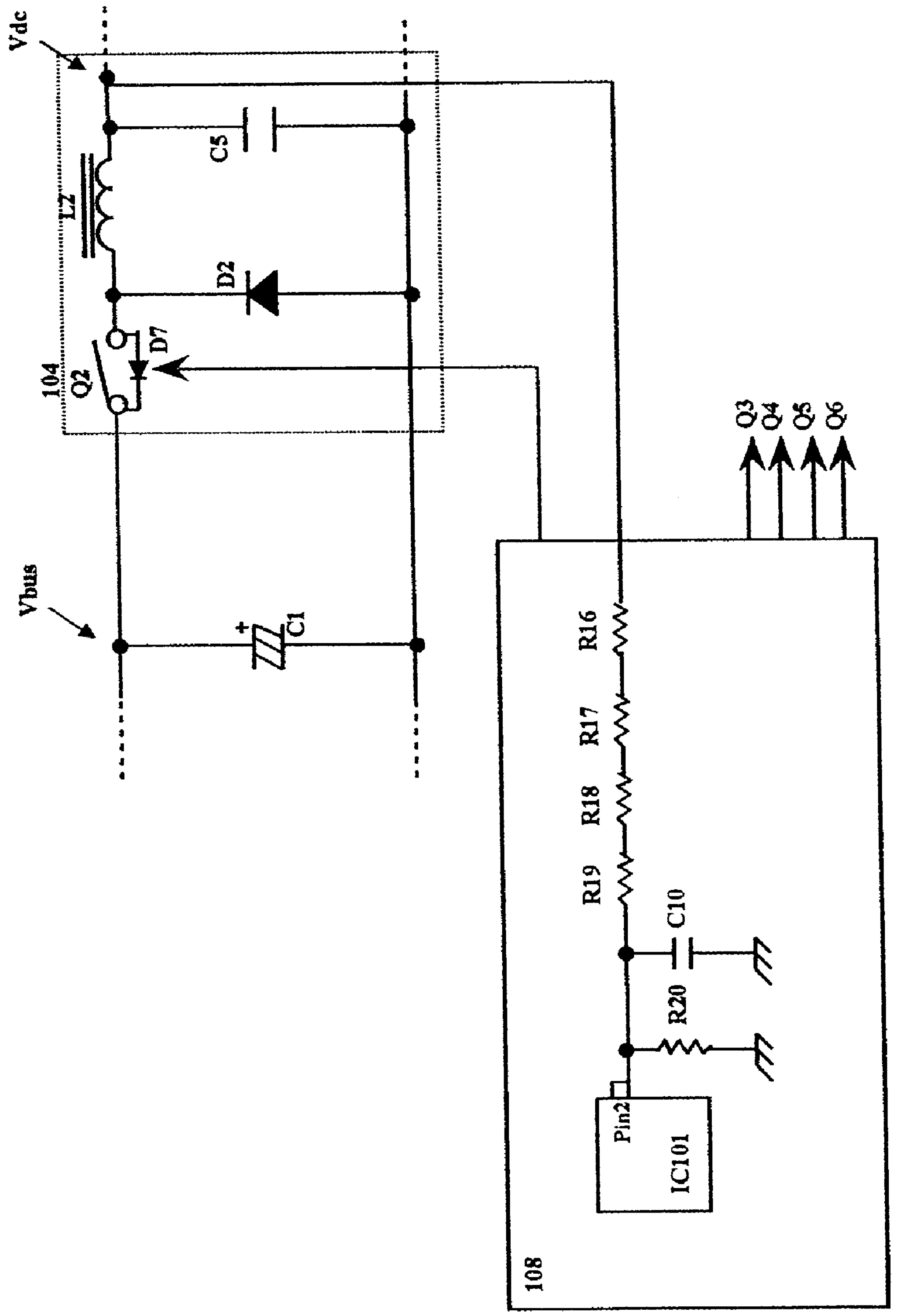
FIG. 5 illustrates a variation of the comparer of the present invention.

In the third embodiment, an output voltage VC5 of capacitor C5 associated with the output of buck chopper circuit 104 is sampled and provided to the inverter controller 108, as shown in FIG. 5. Scaling resistors R16 to R20 are provided to linearly scale down the voltage VC5 to a conversion value $V_{C5}$. FIG. 5 depicts the DC voltage of the conversion value $V_{C5}$ being smoothed by a smoothing capacitor C10 that is connected between electrical ground and the junction of scaling resistors R19 and R20; however, the inclusion of the smoothing capacitor C10 may be omitted without affecting the operation of the present invention. The conversion value $V_{C5}$ is applied to an A/D converter terminal of processor IC101 (pin 2 of processor IC101 in FIG. 5), which has an A/D conversion function.

When the output voltage VC5 of the buck chopper unit 104 is approximately 465 volts, which is substantially equivalent to the output voltage of the DC power supply circuit 102, the voltage division ratio is set so that conversion value $V_{C5}$ to be applied to the processor IC101 is less than a maximum value allowed for the processor IC101, which is approximately 5 volts in most applications. Conversion value $V_{C5}$ is read by processor IC101 as 10-bit data. When the output voltage VC5 is set at approximately 465 volts, that is, when the conversion value $V_{C5}$ is set at approximately 5 volts, the processor IC101 reads the data as a maximum value of D1024. Considering tolerances and ease of calculation, the conversion value of $V_{C5}$ is set to approximately 5 volts when the output voltage VC5 is approximately 500 volts.

In addition, a reference voltage VREF5, for output voltage VC5 at the output of the buck chopper circuit 104, is set at approximately 50 volts, which is significantly less than a normal output voltage of the buck chopper circuit 104. This voltage is set to a level that is lower than a peak voltage of 108 volts, which reflects an estimated 10 percent deviation from the nominal voltage of 120 volts typically provided by the commercial power supply 110. Conversion value $V_{REF5}$ of the reference voltage VREF5 is stored in the processor IC101 as 10-bit data. Conversion value $V_{REF5}$ is set in the processor IC101 at D102, which is calculated based on a ratio of VREF5 (equal to approximately 50 volts) to a maximum output voltage of the output voltage VC5 (equal to approximately 500 volts), when the maximum output voltage of the output voltage VC5 at the buck chopper circuit 104 is set at D1024.

When the commercial power supply voltage is applied to discharge lamp lighting device 101 having the above-described configuration, a voltage approximately equal to 1.414 times the input voltage is smoothed and applied to the output terminal of capacitor C1 of the DC power supply circuit 102, as described above. Auxiliary power supply unit 109 outputs a power supply voltage for a control operation based on the voltage at capacitor C1, to activate processor IC101.

Inverter controller 108 determines whether to output the driving control signals to the buck chopper circuit 104 and the polarity reversing circuit 105 based upon the comparison of the conversion values $V_{C5}$ and $V_{REF5}$. The driving signals are output when the following equation is satisfied:

$$V_{C5}<V_{REF5}.$$

When the commercial power supply 110 is connected to the external voltage receiving unit 111 of the discharge lamp lighting device 101 and the buck chopper circuit 104 is not operating, the output voltage VC5 of the buck chopper circuit 104 is approximately equal to 0 volts. Thus, a normal switching operation may take place, as the conversion value $V_{C5}$ will be less than the conversion value $V_{REF5}$. On the other hand, if the external power supply 110 is accidentally connected to the external output unit 112 of the discharge lamp lighting device 101, a DC voltage that is approximately equal to 1.414 times the power supply voltage will be provided across capacitor C5, even though the buck chopper circuit 104 is not operating. Thus, the conversion value $V_{C5}$ will be greater than the conversion value $V_{REF5}$, and the processor IC101 will maintain the discharge lamp lighting device 101 in the standby state. That is, the buck chopper circuit 104 and the polarity reversing circuit 105 will not start, preventing damage to the switching elements Q3 to Q6 of the polarity reversing circuit 105.

It is noted that this embodiment does not apply to the full bridge only topology shown in FIG. 1C, as that topology omits the buck chopper circuit 104.

A fourth embodiment of the invention will now be described with reference to FIGS. 1A, 1B, and 5.

In the fourth embodiment, discharge lamp lighting device 101 comprises a boost chopper circuit 102 that outputs a regulated voltage of approximately 465 volts, as output voltage VC1 of the DC power supply circuit 102 for a commercial power supply input voltage of approximately 120 volts to approximately 277 volts. The buck chopper circuit 104 outputs a DC voltage that is approximately the same as the output voltage VC1 when a high-pressure discharge lamp 113 is turned OFF, and outputs a voltage related to the impedance of the high-pressure discharge lamp 113 while the high-pressure discharge lamp 113 is turned ON (i.e., lit). A conversion method for output voltage VC5 of the above-noted buck chopper is configured as shown in FIG. 5, and discussed above in the third embodiment. Hence, a discussion of the specific configuration is dispensed with in this embodiment.

In the fourth embodiment, when the output voltage VC5 of the buck chopper circuit is substantially equal to 465 volts, which is approximately the same as the output voltage of the DC power supply circuit 102, the voltage division ratio is set so that conversion value $V_{C5}$ applied to processor IC101 is less than a maximum value typically allowed for the processor (i.e., 5 volts in most applications). Conversion value $V_{C5}$ is read by processor IC101 as 10-bit data. When the output voltage VC5 is approximately 465 volts, that is, when conversion value $V_{C5}$ is approximately 5 volts, a maximum data value of D1024 is read by the processor IC101. Considering tolerances and ease of calculation, the conversion value of $V_{C5}$ is set to be substantially equal to 5 volts when the output voltage VC5 is substantially equal to 500 volts.

In addition, a reference voltage VREF6, for the output voltage VC5 at buck chopper circuit 104 (which is approximately equal to a normal buck chopper output voltage of 465 volts in the disclosed embodiment), is set to be equal to a slightly lower value, such as, for example, approximately 440 volts. This voltage is set to a level that is lower than a 2 to 3 percent deviation from the output voltage VC5 (465*0.97 equals 451 volts) and higher than a peak value of a maximum voltage of 305 volts for a commercial power supply (305*1.414 equals 431 volts). Conversion value $V_{REF6}$ of reference voltage VREF6 is stored in the processor IC101 as 10-bit data. The digital form of the conversion value $V_{REF6}$ is set at D900, which is calculated based on the ratio of VREF6 (approximately equal to 440 volts) to the maximum output voltage of output voltage VC1 (approximately equal to 500 volts). As noted above, while the processor IC101 comprises a part of the inverter controller 108 in the disclosed embodiment, it is understood that the processor could be separate from the inverter controller without departing from the scope and/or spirit of the invention.

When the commercial power supply 110 is applied to the discharge lamp lighting device 101 having the above-described configuration, a voltage that is approximately equal to 1.414 times the input voltage is smoothed and applied to the output terminal of capacitor C1 of the DC power supply circuit 102, as described above. Auxiliary power supply unit 109 outputs a power supply voltage for the control operation based on the voltage of capacitor C1 to control the operation of the processor IC101.

Inverter controller 108 operates to output a control signal that starts a switching operation exclusively for the buck chopper circuit 104. Specifically, the buck chopper circuit 104 is switched to regulate the output voltage VC5 of the buck chopper circuit 104 from the output voltage VC1 (substantially equal to 465 volts) at the DC power supply circuit 102.

The conversion values $V_{C5}$ and $V_{REF6}$ are compared by a program executed by the processor IC101 to determine the operational state of the polarity reversing circuit 105. When the conversion value $V_{C5}$ is greater than the conversion value $V_{REF6}$, driving control signals are outputted to the polarity reversing circuit 105.

When the commercial power supply 110 is connected to the external voltage receiving unit 111 of the discharge lamp lighting device 101, the auxiliary power supply unit 109 provides a voltage to the DC power supply controller 107. The DC power supply circuit 102 then executes a boost chopper circuit operation, by which capacitor C1 is charged to approximately 465 volts. Output voltage VC5 of the buck chopper circuit 104 becomes equal to approximately the same level (i.e., 465 volts), such that the conversion value $V_{C5}$ is greater than the conversion value $V_{REF6}$, and thus, the process proceeds to a normal switching operation to turn ON the discharge lamp 113.

On the other hand, if the commercial power supply 110 is accidentally connected to the external output unit 112 of the discharge lamp lighting device 101, the DC power supply circuit 102 does not receive any voltage at its input terminals. As a result, capacitor C5 of the buck chopper circuit 104 is charged to approximately 1.414 times the commercial power supply voltage through the polarity reversing circuit 105. Thus, the conversion value $V_{C5}$ will be less than the conversion value $V_{REF6}$ and the processor IC101 will operate to maintain the discharge lamp lighting device 101 in the standby state. Therefore, the switching operation of the polarity reversing circuit 105 does not start, preventing damage to the switching elements Q3 to Q6 of the polarity reversing circuit 105.

It is noted that this embodiment does not apply for the full bridge only topology, such as shown in FIG. 1C, because the buck chopper circuit 104 is omitted therein.

A fifth embodiment of the invention will now be described. The fifth embodiment of the present invention will be described with reference to FIGS. 1A-1C and 6.

Figure 6:
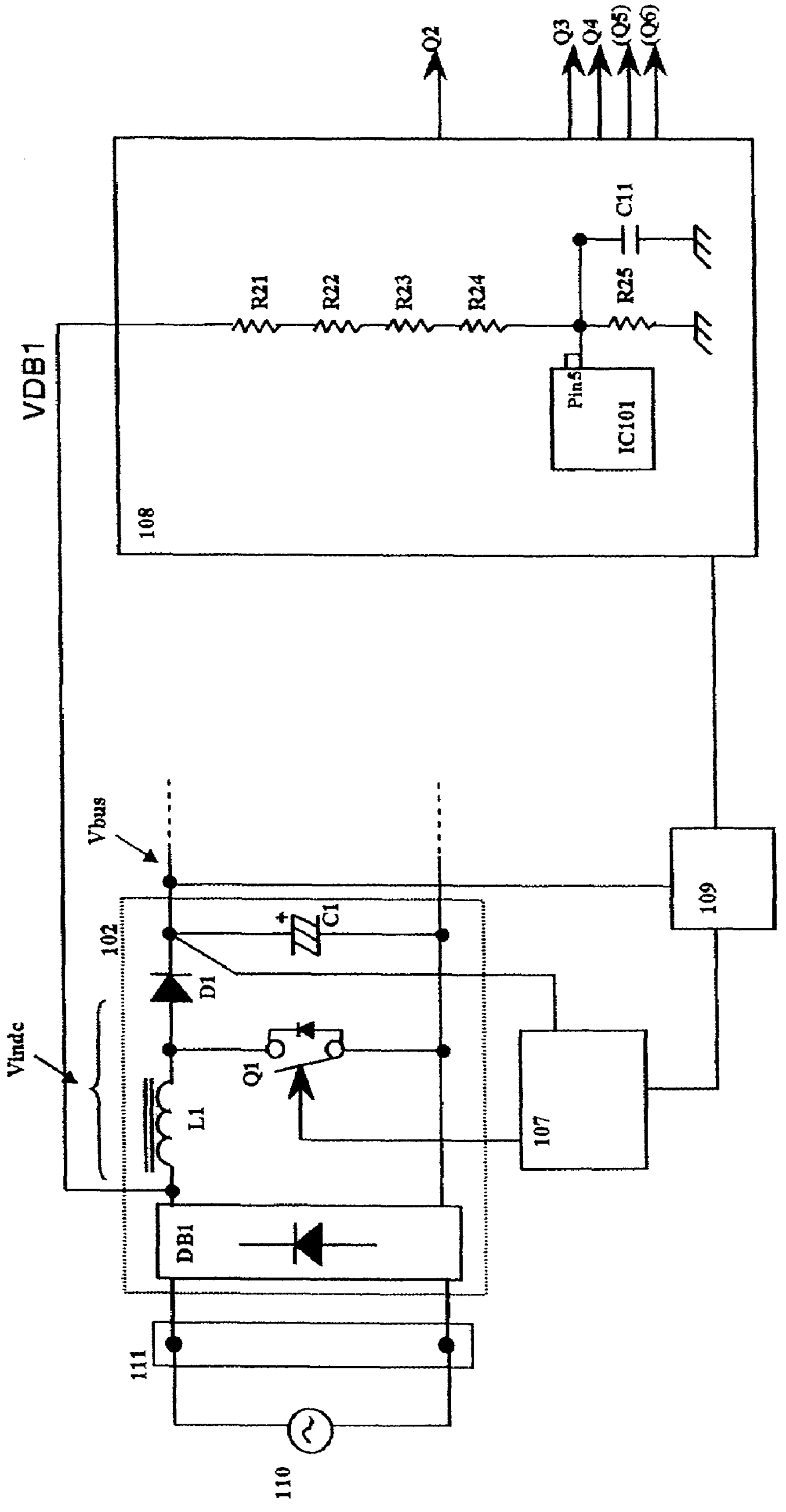
FIG. 6 illustrates another variation of the comparer of the present invention.

Discharge lamp lighting device 101 includes a boost chopper circuit that produces a regulated voltage of approximately 465V as an output voltage VC1 by the DC power supply circuit 102 for a commercial power supply voltage of approximately 120 volts to approximately 277 volts. An AC-to-DC voltage rectifier, such as rectifier DB1, provides an output voltage VDB1, which is supplied to the inverter controller 108, as shown in FIG. 6. Scaling resistors R21 to R25 are used to linearly scale down the output voltage VDB1 to a conversion value $V_{DB1}$. The conversion value $V_{DB1}$ is inputted to an A/D converter terminal of the processor IC101 (i.e., pin 5 of processor IC101, as shown in FIG. 6) that includes an A/D conversion function. Further, a smoothing capacitor may optionally be provided between the junction of scaling resistors R24 and R25 and electrical ground, although modern microprocessors are sufficiently fast, and thus, the smoothing capacitor C11 is generally not necessary.

When the output voltage VDB1 of the rectifying circuit DB1 is at an approximate maximum value of 431 volts (which corresponds to 1.414 times a maximum AC power supply voltage of 305 volts), a voltage division ratio is set so that the conversion value $V_{DB1}$ applied to the processor IC101 does not exceed a maximum permissible value allowed by the processor, which, in most applications, is typically 5 volts. Conversion value $V_{DB1}$ is read by the processor IC101 as 10-bit data. When the output voltage VDB1 is approximately equal to 431 volts, that is, when the conversion value $V_{DB1}$ is substantially equal to 5 volts, a maximum data value of D1024 is read by the processor IC101. Considering tolerances and ease of calculation, the conversion value of $V_{DB1}$ is selected to be substantially equal to 5 volts when the output voltage of VDB1 is substantially equal to 500 volts.

In addition, a reference voltage VREF7 (associated with the output voltage VDB1) is set to be equal to approximately 50 volts. This voltage is selected to be set at a level that is lower (smaller) than a peak voltage of 108 volts, which reflects an estimated 10 percent deviation from a nominal voltage of 120 volts for a commercial AC power supply. Conversion value $V_{REF7}$ of the reference voltage VREF7 is stored in processor IC101 as 10-bit data. Conversion value $V_{REF7}$ is set at D102, which is calculated based on a ratio of $V_{REF7}$ (which is substantially equal to 50 volts) to a maximum output voltage of VREF7 (which is substantially equal to 500 volts), when a maximum output voltage of the rectifying circuit DB1 is set at D1024.

When the commercial power supply 110 is applied to the discharge lamp lighting device 101 having the above-described configuration, a voltage that is approximately equal to 1.414 times the input voltage is smoothed and applied across capacitor C1 of the DC power supply circuit 102. Auxiliary power supply unit 109 outputs a power supply voltage for the control operation based on the voltage across the capacitor C1, to activate the processor IC101.

Driving control signals from the inverter controller 108 are selectively output to drive the polarity reversing circuit 105 in response to a comparison of conversion values $V_{DB1}$ and $V_{REF7}$ by a program executed by the processor IC101.

When the commercial power supply 110 is supplied to the external voltage receiving unit 111 of the discharge lamp lighting device 101, the output voltage VDB1 becomes equal to approximately 1.414 times the power supply voltage. As a result, the conversion value $V_{DB1}$ is greater than the conversion value $V_{REF7}$. Therefore, a normal switching operation may commence. On the other hand, if the commercial power supply 110 is accidentally connected to the external output unit 112 of the discharge lamp lighting device 101, output voltage VDB1 will be equal to approximately 0 volts, as diode D1 will prevent a voltage backflow. Thus, the conversion value $V_{DB1}$ will be less than the conversion value $V_{REF7}$. As a result, the processor IC101 will maintain the discharge lamp driving device 101 in the standby state. Therefore, the switching operation of the polarity reversing circuit 105 does not start, which prevents damage to the switching elements of the polarity reversing circuit 105.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiment, and various variations and modifications may be possible without departing from the scope of the present invention.

What is claimed:

1. An apparatus for lighting a discharge lamp, comprising:

a DC power supply that generates a predetermined DC voltage in response to an AC power source from an external voltage receiver;

a DC power supply controller that controls an operation of a switching element of said DC power supply;

an inverter having a plurality of switching elements that changes said predetermined DC voltage to an AC voltage sufficient to light a discharge lamp;

an inverter controller that controls an operation of said plurality of switching elements of said inverter;

an external outputter that supplies said AC voltage from said inverter to said discharge lamp;

an auxiliary power supply that generates an operating voltage to power said DC power supply controller and said inverter controller based upon the power source from an external voltage receiver, said auxiliary power supply being configured to generate the operating voltage to power said inverter controller even if said AC power source is supplied to said external outputter; and a protector that operates to inhibit the operation of said plurality of switching elements of said inverter in response to a comparison of a monitor voltage obtained from said discharge lamp lighting apparatus with a reference voltage.

2. The apparatus of claim 1, wherein said monitor voltage represents a voltage at a junction of a pair of said plurality of switching elements of said inverter, said protector inhibiting the operation of said plurality of switching elements when said monitored voltage is determined to exceed said reference voltage, while enabling the operation of said plurality of switching elements when said monitored voltage is determined to be less than said reference voltage.

3. The apparatus of claim 1, wherein said monitor voltage represents said predetermined DC voltage of said DC power supply, said protector inhibiting the operation of said plurality of switching elements when said predetermined DC voltage is determined to be less than said reference voltage, while enabling the operation of said plurality of switching elements when said DC power supply is determined to be greater than said reference voltage.

4. The apparatus of claim 1, wherein said inverter includes a buck chopper, said monitor voltage representing an output voltage of said buck chopper, said protector inhibiting the operation of said plurality of switching elements when said output voltage of said buck chopper is determined to exceed said reference voltage, while enabling the operation of said plurality of switching elements when said output voltage of said buck chopper is determined to be less than said reference voltage, said reference voltage being significantly less than a normal output voltage of said buck chopper.

5. The apparatus of claim 1, wherein said inverter includes a buck chopper, said monitor voltage representing an output voltage of said buck chopper, said protector inhibiting the operation of said plurality of switching elements when said output voltage of said buck chopper is determined to be less than said reference voltage, while enabling the operation of said plurality of switching elements when said output voltage of said buck chopper is determined to be greater than said reference voltage, said reference voltage approximating a normal output voltage of said buck chopper.

6. The apparatus of claim 1, wherein said DC power supply comprises a boost rectifier, said monitor voltage representing an output voltage of an AC-to-DC rectifier, said protector inhibiting the operation of said plurality of switching elements when said output voltage of said AC-to-DC rectifier is determined to be less than said reference value, while enabling the operation of said plurality of switching elements when said output voltage of said AC-to-DC rectifier is determined to be greater than said reference value, said reference voltage being significantly less than a normal commercial power source.

* * * * *